United States Patent [19]

Mizusawa et al.

[11] Patent Number: 4,478,545
[45] Date of Patent: * Oct. 23, 1984

[54] FASTENING DEVICE FOR PANELS OR THE LIKE

[75] Inventors: Akira Mizusawa, Fujisawa; Yoshiaki Notoya, Zushi, both of Japan

[73] Assignee: Nifco Inc., Yokohama, Japan

[*] Notice: The portion of the term of this patent subsequent to Jan. 11, 2000 has been disclaimed.

[21] Appl. No.: 418,167

[22] Filed: Sep. 14, 1982

Related U.S. Application Data

[62] Division of Ser. No. 165,401, Jul. 2, 1980, Pat. No. 4,367,995.

[30] Foreign Application Priority Data

Jul. 6, 1979 [JP] Japan .................................. 54-85043

[51] Int. Cl.³ .................................................. F16B 13/06
[52] U.S. Cl. ............................................ 411/57; 411/60; 411/182; 411/437; 411/908
[58] Field of Search .................................... 411/15-18, 411/44, 57, 60, 182, 337, 360, 366, 427, 511, 512, 908, 437; 24/211 R, 217 R, 291, 297

[56] References Cited

U.S. PATENT DOCUMENTS

| | | | |
|---|---|---|---|
| 2,333,277 | 11/1943 | Swank | 411/57 |
| 2,393,606 | 1/1946 | Brush | 411/57 |
| 2,788,047 | 4/1957 | Rapata | 411/182 |
| 2,871,749 | 2/1959 | Kalb | 411/57 |
| 3,099,931 | 8/1963 | Ferdinand | 24/211 R |
| 3,182,544 | 5/1965 | Rapata | 411/49 |
| 3,345,899 | 10/1967 | Fiddler | 411/437 |
| 3,495,494 | 2/1970 | Scott | 411/908 |
| 3,613,497 | 10/1971 | Heldermann | 411/60 |
| 3,918,130 | 11/1975 | Poe | 411/41 |
| 3,937,122 | 2/1976 | Riedel | 411/34 |
| 4,083,289 | 4/1978 | Erickson | 411/16 |

Primary Examiner—Thomas J. Holko
Assistant Examiner—Neill Wilson
Attorney, Agent, or Firm—Wenderoth, Lind & Ponack

[57] ABSTRACT

A fastening device of synthetic resin comprises a male member provided on its shaft portion with screw threads and a female member having at least one pitch of spiral thread on the inside surface of the bore thereof. A plurality of apertured panels are positively fastened face to face by inserting the leg of the female member into apertures of the panels and subsequently, forcing the shaft portion of the male member into the bore of the female member. The panels thus fastened can be separated by rotating the male member so as to threadably extract the male member from the female member.

8 Claims, 11 Drawing Figures

FASTENING DEVICE FOR PANELS OR THE LIKE

REFERENCE TO RELATED APPLICATION

This application is a division of application Ser. No. 165,401, filed July 2, 1980, now U.S. Pat. No. 4,367,995.

BACKGROUND OF THE INVENTION

This invention relates to a fastening device for fastening a plurality of panels or the like, and more particularly, to a fastening device comprising female and male members of synthetic resin and designed to fasten at least two panels in the face-to-face contact.

It has been widely known that fasteners made of synthetic resin are extensively used in fitting together parts in automobiles and assembling electrical appliances, etc. Among these known fasteners are included fasteners of the kind composed of two members, male and female and designed to fasten a plurality of panels face to face. The most popular fastener of this kind comprises a female member of synthetic resin provided with a flange, a leg integrally connected to the lower surface of the flange and split lengthwise so as to allow lateral or radial expansion, and a bore made along the axial length of the leg from the upper center portion of the flange, and a male member made of metal adapted to advance into the bore of the female member thereby causing the leg to radially expand. This fastener has a construction such that two panels are fastened face to face by inserting the leg of the female member through the aperture of one of the panels until the flange comes into contact with the upper surface of the panel and then by laying the other panel on the upper side of the flange and subsequently threading the male member into the bore made along the axial direction from the upper center portion of the flange thereby fastening the latter panel to the upper side of the flange and, at the same time, causing the leg of the female member to expand radially within the aperture of the former panel. This fastener, therefore, entails a work of threading the male member as described above so as to fasten the two panels together.

This threading operation does not necessarily prove easy where numerous kinds of parts are fitted on products during an assembly line process. In an effort to overcome the difficulty, there has been proposed a fastener which uses a rod-shaped male member of synthetic resin in place of the aforementioned threaded male member and which provides the fastening together of two panels by simply driving the male member forcibly into the bore of the female member.

This forced entry type fastener for fastening parts has advantages over the screw-type fastener as described above since it effects the fastening by simply driving the male member forcibly into the bore of the female member. On the other hand, it has a disadvantage that when parts fastened therewith are required to be replaced with new ones, the male member driven forcibly into the bore must be extracted therefrom which involves arduous work. As a solution to this difficulty, there has been proposed a fastener wherein the male member is provided with a portion adapted to project from the upper surface of the flange of the female member when the male member has been driven home fixedly positioned within the bore of the female member. When the two members of the fastener are to be separated from each other, the extraction of the male member is accomplished by conveniently axially pulling the projection portion outward. Depending on the place at which the fastener is used, however, the protrusions of the projection portion may prove inconvenient. Particularly where parts are fitted in automobiles and electrical appliances, the projection portion may interfere with the fitting of other parts or impair the appearance of finished products. Also, the use of such fasteners may be impractical for reasons of poor safety.

SUMMARY OF THE INVENTION

One object of the present invention is to provide a fastening device which can easily fasten a plurality of panels in the face-to-face contact and is capable of easy disengagement to permit repeated use.

To attain these and other objectives according to the present invention, there is provided a fastening device made of synthetic resin, which comprises a female member having a flange, a leg extending longitudinally from the lower surface of the flange and adapted to be expanded radially, a bore made along the longitudinal axis of the leg from the upper center portion of the flange, and a spiral thread circumferentially formed on the inner peripheral wall of the bore; a male member provided with a head portion, and a shaft portion for insertion into the bore of the female member, which shaft portion extends vertically from the lower surface of the head portion and has external screw threads on its circumferential surface so as to mesh with the spiral thread of the female member.

The fastening device of the present invention is intended to fasten two panels together by inserting the leg of the female member in apertures bored in the two panels and exactly registered when the panels come into face-to-face contact with each other, and then by forcibly driving the shaft portion of the male member into the bore of the female member thereby radially expanding a portion of the leg of the female member and allowing the two panels to be squeezed between the expanded portion of the leg and the flange. A plurality of panels are fastened face to face by inserting the leg of the female member into the apertures of the panels and by subsequently forcing the shaft portion of the male member into the bore of the female member while allowing the shaft portion including the external screw threads to flex and to ride over the spiral thread of the female member to bring the leg into a radially expanded state, thereby enabling the panels to be squeezed between the expanded portion of the leg and the flange of the female member and insuring continued engagement of the panels by means of the spiral thread of the female member. The panels thus fastened firmly are separated by rotating the head portion of the male member so as to threadably disengage the male member from the female member thereby axially extracting the shaft portion of the male member from the bore of the female member and radially contracting the leg of the female member. The fastening device of this invention, therefore, can be used repetitively.

The other objects and characteristic features of the present invention will become apparent from the description to be given in further detail hereinafter with reference to the preferred embodiments illustrated in the accompanying drawings.

DESCRIPTION OF THE PREFERRED EMBODIMENTS

Figure 9:
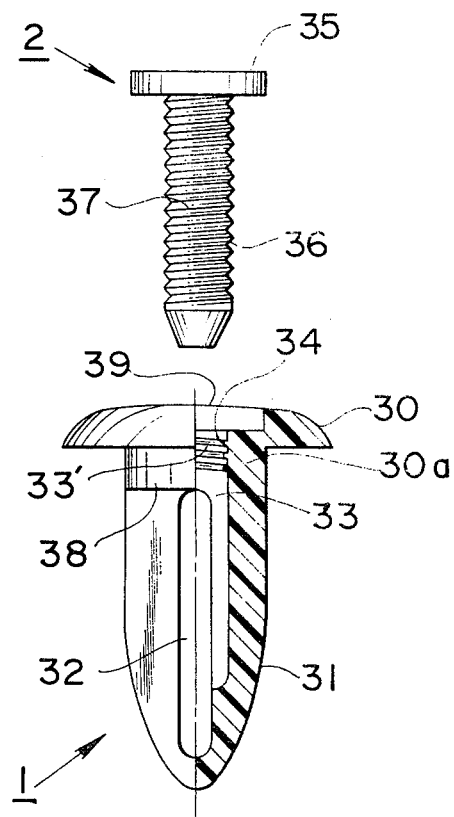
FIG. 9 is a front view of the third embodiment of the fastening device according to this invention, with a portion of the female member shown in cross section.
Figure 10:
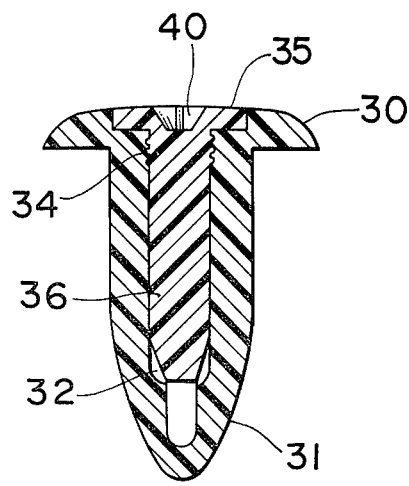
FIG. 10 is a centrally longitudinally sectioned front view of the fastening device of FIG. 9 with the members thereof operatively engaged.
Figure 11:
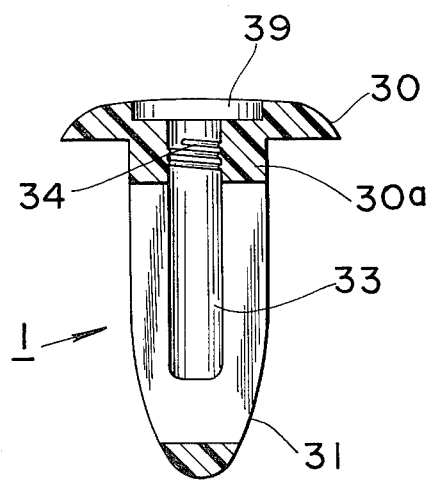
FIG. 11 is a centrally longitudinally sectioned side view of the female member of the fastening device of FIG. 9.

FIGS. 1-4 illustrate the first preferred embodiment, FIGS. 5-8 the second preferred embodiment and FIGS. 9-11 the third preferred embodiment respectively of the present invention. In all the drawings, 1 denotes the female member of the fastening device of the present invention, 2 the male member which, in cooperation with the female member 1, fastens panels to one another and 3 and 3' a plurality (not necessarily limited to "two" as shown in the drawings) of aperatured panels to be fastened with the fastening device of the present invention.

In the first preferred embodiment, the female member 1 comprises a body 15 of an approximately rectangular cross section conforming to the shape of the apertures 3a and 3a' made in the panels 3 and 3', a plate-shaped flange 10 formed in a circular or rectangular shape and extending laterally from the body 15 and a leg 11 extended vertically from the center of one side of the body 15. The leg 11 is divided into two opposed prongs by a longitudinally extending slit or groove 12 extending longitudinally in the axial direction of the leg. By virtue of this slit, the leg 11 is able to contract radially or conversely to be expanded radially outwardly when an outward radial force is exerted therein. At the center of the flange 10 is disposed a bore 13 which pierces the body 15 from the upper side and extends through the lower side of the body 15 and further extends downwardly along the center longitudinal axis of the leg 11 and terminates at the lower end of the leg. A spiral thread 14 is circumferentially formed on and protrudes inwardly from the inside surface of the bore 13 near an upper opening 13' in the body 15.

Further, the male member 2 which cooperates with the female member 1 comprises a head portion 16 and a shaft portion 17 extending vertically from one side of the head portion. The circumferential surface of the shaft portion 17 is threaded along the entire length of the shaft portion 17. On the other side of the head portion 16 is formed an engaging groove 19 for engaging with the tip of a screwdriver. Thus, the male member is generally shaped like a bolt. The shaft portion 17 of the male member has such a diameter and length substantially equal to those of the bore 13 of the female member.

The female member 1 and the male member 2 constructed respectively as described above are separately molded of a thermoplastic synthetic resin such as, for example, nylon which suitably combine rigidity and flexibility.

The fastening device of the present preferred embodiment constructed as described above is intended for use in fastening two apertured panels 3 and 3', for example, into a face-to-face fixed union. The apertures 3a and 3a' in the panels have a rectangular cross-sectional shape suitable for fittingly engaging with the seat 15a formed on the outer periphery of the female member. Prior to the union of the panels, the panels are brought into face-to-face contact with each other and are adjusted in their relative position so that their respective apertures are exactly registered with each other. The leg 11 of the female member 1 is inserted through the registered apertures until the flange comes into contact with an upper surface of the upper panel 3 and consequently, the seat 15a seats with the periphery of the aperture 3a. If the leg 11 has a diameter slightly greater than that of the apertures 3a, 3a', the insertion of the leg therein is nonetheless possible since the leg is allowed to contract radially by virtue of the slit or groove 12.

Figure 1:
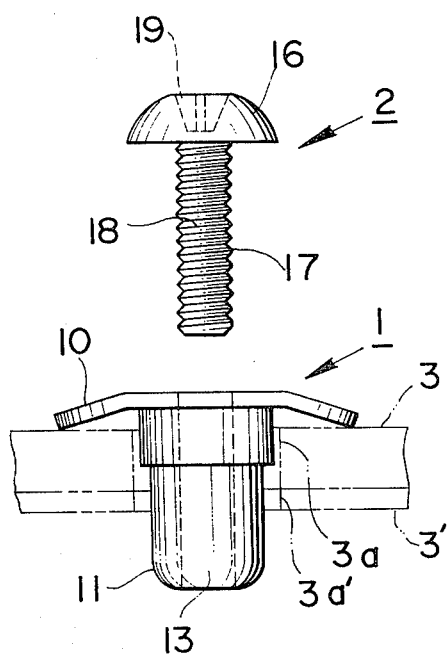
FIG. 1 is a front view of the first embodiment of the fastening device according to the present invention.
Figure 2:
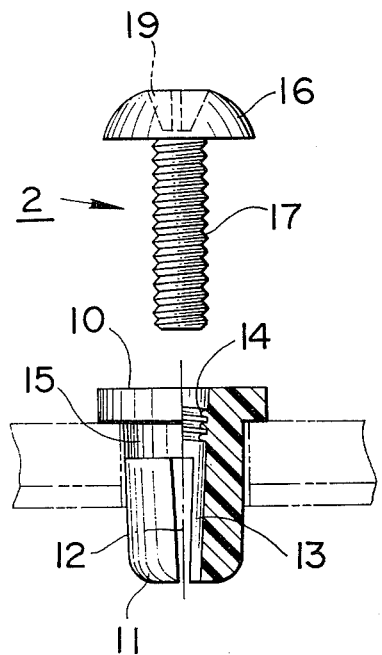
FIG. 2 is a side view of the fastening device of FIG. 1, partly in section.
Figure 3:
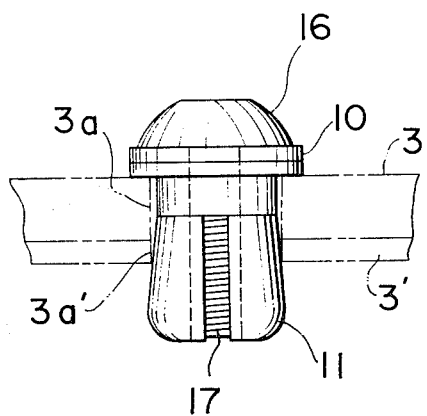
FIG. 3 is a side view of the fastening device of FIG. 1 with the members thereof operatively engaged.
Figure 4:
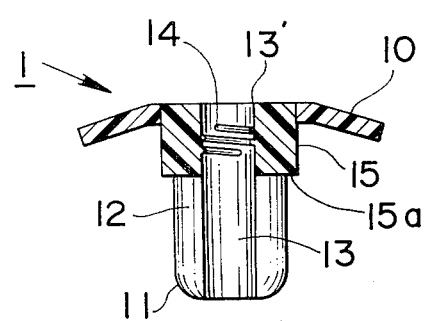
FIG. 4 is a sectioned side view of the fastening device of FIG. 1.
Figure 5:
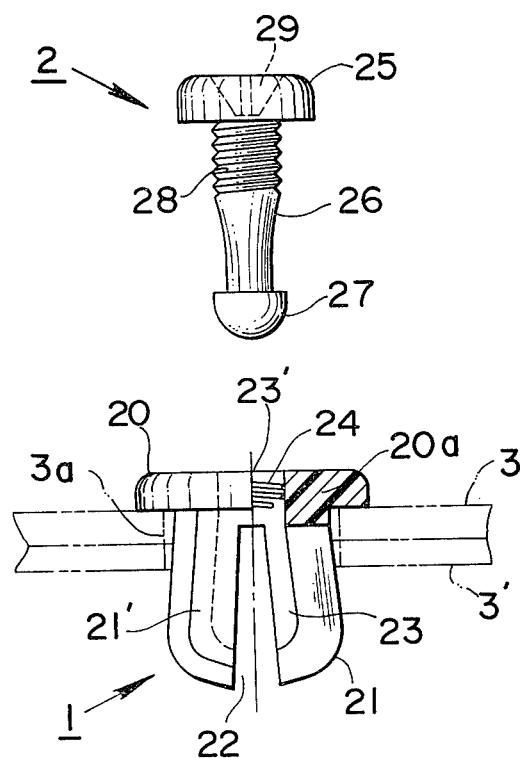
FIG. 5 is a front view of the second embodiment of the fastening device according to this invention, partly in section.
Figure 6:
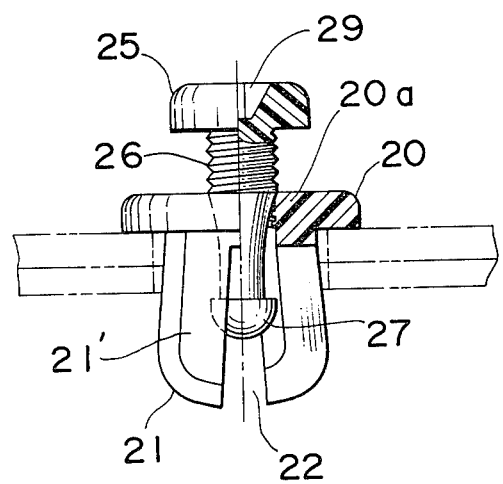
FIG. 6 is a front view of the fastening device of FIG. 5 in a semi-fastened state, partly in section.
Figure 7:
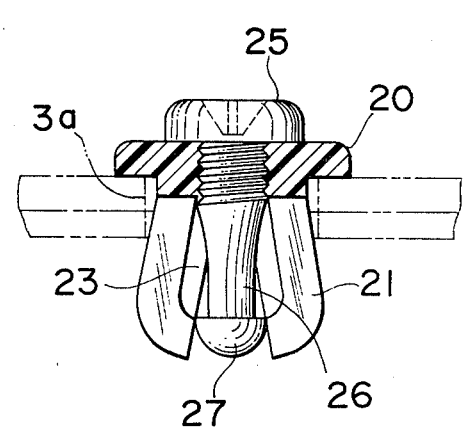
FIG. 7 is a partially sectioned front view of the fastening device of FIG. 5 with the members thereof operatively engaged.
Figure 8:
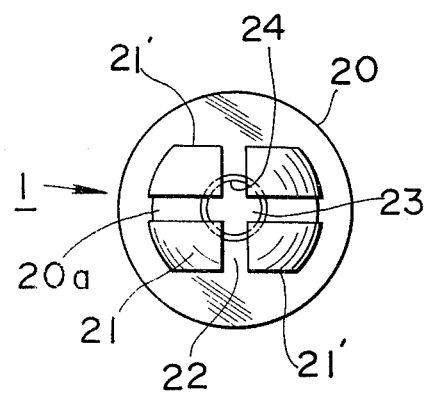
FIG. 8 is a bottom view of the female member of the fastening device of FIG. 5.

After the insertion of the leg 11 into the apertures 3a and 3a' as described above, the shaft portion 17 of the male member 2 is initially inserted straight into the bore 13 in the axial direction thereof to pierce the body 15, and the shaft portion 17 is subsequently forced completely into the bore 13 while allowing the screw threads 18 of the male member to ride over the spiral threads 14 on the inside surface of the female member by an inwardly axial force being exerted on the head portion 16 of the male member. Upon entering the bore 13, the shaft portion causes the leg 11, which has been somewhat contracted radially so as to fit within the apertures 3a and 3a', to be outwardly expanded and a portion of the leg which is protruded from the lower surface of the lower panel 3' is more expanded as illustrated in FIG. 3. Thus, the fastening together of the two panels is completed. With regard to the insertion of the male member into the leg 11, the male member 2 is subject to a resistance reaction exerted by the spiral threads 14 formed on the inside surface of the bore 13 because the diameter of the shaft portion 17 is substantially the same as that of the bore 13. However, since the female member and the male member are both made of flexible synthetic resin as described above, the spiral threads 14 deform and the external screw threads 18 of the shaft portion 17 of the male member together deform so as to allow a forced insertion of the shaft portion into the bore 13. When the forced insertion is completed, the deformed components resume their original shapes, resulting in the spiral threads 14 being threadably engaged with the corresponding screw threads 18 of the male member.

As described above, the fastening device can accomplish the fastening of the panels together by the simple method of inserting the leg 11 of the female member into the apertures 3a and 3a' of the panels and subsequently forcing the shaft portion 17 of the male member straight into the bore 13 of the female member. When the panels are to be subsequently separated, since the spiral threads 14 on the inside surface of the bore are threadably engaged with the screw threads 18 of the shaft portion 17, an appropriate rotation of a screwdriver, whose tip is fitted in the engaging groove 19 formed in the head portion of the male member, enables the shaft portion 17 to be easily threaded out of the bore 13. Consequently, the leg 11 expanded radially within the apertures of the panels is subsequently contracted in the radial direction thus permitting the panels to be extracted. During the threaded disengagement of the male member from the female member, the male member never entrains the female member therewith because the rectangular body 15 of the female member is fixedly seated within the rectangular aperture 3a and is thus prevented from rotating about its axis.

The second preferred embodiment of the invention will be described with reference to FIGS. 5–8. The leg 21 of the female member 1 is extended vertically from the one side of the body 20a from which flange 20 extends laterally. The leg 21 is divided into four prongs by a cross slit or groove 22 extending along the entire length of the leg from the lower end of the body 20a in the longitudinal direction. The bore 23 extends from the upper portion of the body 20a to the middle portion of the leg along the axis thereof. The bore 23 is formed so that the diameter thereof is greater at the middle portion of the leg than that at the upper opening 23'. Along the inside surface of the bore 23 in body 20a close to the opening 23' is formed a spiral thread 24. To correspond to the aforementiond variable diameter of the bore 23, the outside diameter of the leg 21 in its normal state is likewise greater at the longitudinal middle portion thereof than that at the upper portion thereof adjacent the flange. Further, the outer peripheries of the part of the body 20a beneath the flange and of the leg are shaped so as to form flat surfaces 21' throughout the entire axial length of these portions of the body and of the leg.

With regard to the male member 2, the shaft portion 26, which is extended vertically from the lower side of the head portion 25, has a diameter which decreases from the longitudinal middle portion toward a semispherically enlarged portion 27. The circumferential surface of the upper half portion of the shaft portion is provided with screw thread 28. Also the shaft portion 26 is slightly longer than the bore 23 of the female member in axial length so that the enlarged portion 27 at the free end thereof projects from the bore and wedges between the inner surfaces of the slit 22 at the free end of the leg 21 when the shaft portion is forced into the bore. The threaded portion of the shaft portion 26 has a diameter substantially equal to that of the bore 23 at the upper opening 23' thereof.

The fastening device in the present preferred embodiment is used in much the same manner as that of the first preferred embodiment, with the exception that firstly, the male member can be partially engaged with the female member so that the enlarged portion 27 of the shaft is deposited within the enlarged diametrical portion of the bore 23 of the leg 21 before the female member is inserted into the apertures 3a and 3a' of the panels 3 and 3'.

The face-to-face fastening of the panels is accomplished by inserting the leg of the female member through the apertures of the panels and subsequently forcing the shaft portion 26 completely into the bore 23 by exerting an appropriate axial force on the head portion 25 of the male member.

During the forced insertion, the threaded portion 28 of the shaft portion 26 flexes over the spiral threads 24 of the inside surface of the bore so as to permit the straight entry of the shaft portion 26 into the bore and, at the same time, the enlarged portion 27 of the shaft penetrates the bottom of the bore and wedges between the inner surfaces of the slit 22, resulting in the split legs 21 being radially expanded. Thus, the panels together are fastened by being fixedly positioned between the expanded portion of leg 21 and the flange 20.

The separation of the panels is accomplished by fitting a screwdriver in the engaging groove 29 formed in the head portion 25 of the male member and by rotating the male member in the suitable direction thereby threadably disengaging the male member from the female member. Consequently, the leg 21 is relieved from its radial expansion and released from the apertures 3a and 3a'. Of course, in the fastener of the present preferred embodiment, the disengagement of the male member from the female member is attained by continuing the rotation of the screwdriver until the enlarged portion 27 is released from the slit or groove 22 and subsequently pulling out the shaft of the male member.

The fastening devices of the preferred embodiments have, as described above, the constructions wherein the female member 1 and the male member 2 are molded separately with respect to each other. Optionally, the fastening device may be formed so that the male and female members are integrally molded in such a state that the lower end of the shaft portion of the male member 2 is engaged with the upper periphery of the bore 13 of the female member through the medium of a thin-walled portion (not shown). With this integrally molded fastening device, the fastening of two panels to each other is accomplished by inserting the leg of the female member through the apertures in the panels, and striking with a wooden hammer or the like the head portion of the male member thereby severing the thin-walled portion from the female member and, at the same time, forcing the shaft portion of the male member into the bore.

The third preferred embodiment illustrated in FIGS. 9–11 represents a modification wherein the free end of the leg 31 of the female member 1 is conically shaped. This leg is provided with a bore 33 made axially from the upper side of the body 30a having the laterally extending flange 30. Further two diametrically opposing grooves 32 are formed in the circumferential wall of the leg 31, and the grooves 32 longitudinally extend along the axial length of the leg 31.

The leg 31 has a radially thickened peripheral wall near the longitudinal middle portion thereof. The bore 33 has a uniform diameter substantially throughout the entire length thereof so as to admit, in a tightly fitted manner, the shaft portion 36 of the male member 2 having a diameter substantially equalling the diameter of the bore. The circumferential surface of the shaft 36 of the male member is externally threaded. The inside surface of the bore 33 in the body 30a near opening thereof for admitting the shaft has internal spiral threads 34 so as to mesh with the screw threads 37 of the shaft 36. Further, on the upper side of the body 30a of the female member 1, the opeing 33' of the bore is radially enlarged so as to form an annular recess 39 which functions to receive and retain the head portion 35 of the male member. The body 30a is provided at the base portion thereof with a seat 38 having a lateral cross section configuration conforming to the peripheral shape of the apertures of the panels.

As described above with respect to the foregoing preferred embodiments, the fastening device of the present invention accomplishes the fastening of two panels by first inserting the leg 31 of the female member through the apertures in the panels until the flange 30 comes into contact with the upper surface of the upper panel (not illustrated in this embodiment) and subsequently forcing the shaft portion 36 of the male member straight into the bore 33 of the female member. In this preferred embodiment, the female member is so adapted that during the insertion of the leg 31 through the apertures of the panels, the above-described radially thickened peripheral wall portion of the leg advances into the apertures while being contracted radially inward by virtue of the above described slits or grooves, and, after being projected through the panels, the leg resumes its normal radially expanded state by virtue of the resiliency of the material thereof. The panels together are fastened when the female member is prevented from radial contraction due to the subsequent forced insertion of the shaft portion 36 of the male member into the bore 33. In consequence of this forced insertion, the male member has its head portion 35 seated in the annular recess 39, with the result that the upper surface of the head portion falls flush with the upper surface of the flange 30. Naturally, during the forced insertion of the shaft portion, the screw threads 37 of the shaft portion inwardly axially advance while riding over the spiral threads 34 formed on the inside surface of the bore and, on completion of this forced insertion, the male and female members are threadably engaged. The separation of the panels is accomplsihed by fitting the tip of a screwdriver in the engaging groove 40 formed on the head portion 35 and rotating the screw driver thereby causing the shaft portion to be threadably disengaged from the inner periphery of the bore.

The fastening device of the present invention has been described above in detail with reference to various preferred embodiments. In the actual use of the fastening device of the present invention, the fastening of two panels in the face-to-face contact is accomplished by inserting the leg of the female member through the registered apertures of the panels and subsequently forcing the shaft portion of the male member straight into the bore of the female member, and the subsequent separation of the panels thus fastened is attained by rotating the male member in the fixed direction with a suitable tool such as a screwdriver and thereby threadably disengaging the male member from the peripheral wall of the bore as described above. Since the above-described operations are easy to perform, the fastening device of the present invention is highly practical. The fastener of the present invention has another advantage that since the head portion of the male member, upon the forced insertion, is brought into tight contact with the upper surface of the flange of the female member and the flange is countersunk, the head and a smooth flange have flush surfaces, and thus the fastener assumes an appearance resembling a rivet. Also, the fastener protrudes only slightly from the panel surface and, therefore, offers no interference with the function of the panel. Further, the fastener functions advantageously in the fastening of machine parts of the kind subject to vibration because the male member is not likely to be loosened from the female member unless the male member is intentionally threadably disengaged therefrom.

The principal functions of the spiral threads of the inside surface of the bore are to engage the screw threads on the incoming shaft portion and, that during the extraction of the shaft portion from the female member, they threadably guide the shaft portion. Instead of the screw threads on the circumferential surface of the shaft portion as involved in the preceding preferred embodiments, a plurality of ridges may be formed on the shaft portion of the male member. Also in the case of such modifications as described above, after the male member has been forced into the female member so as to fasten the panels to each other, the extraction of the shaft portion can be accomplished by rotating the head portion of the shaft portion in the fixed direction thereby causing the shaft portion to threadably extract axially from the female member. Although the pitch number and height of the spiral threads are not specifically limited as described above, the spiral threads must fulfill the requirement that, during the forced insertion of the male member, they must flex thereby providing no hindrance to the straight axial inward advance of the shaft portion into the female member and, upon completion of the forced insertion, the spiral threads of the female member should engage with the screw threads of the male member formed on the outer circumferential surface of the shaft portion. For this reason, the spiral threads are required to have an appropriate pitch number with respect to the elasticity and rigidity of the material used therefor.

The foregoing preferred embodiments have been described with regard to particularly the disposition of spiral threads on the inside surface of the bore near the opening of the bore in the body. The reason for this location is that, at this particular position, the inside surface of the bore maintains substantial radial stability and that this portion of the inside surface is inconstant contact with the shaft portion of the male member during the insertion of the shaft portion. In this sense, it is most ideal for the spiral threads to be disposed in the portion of the inside surface of the bore which corresponds to the body.

In summary, it is essential for the proper functioning of the present invention for the spiral threads to be formed on the inside surface of the bore and for these spiral threads to threadably engage with the screw threads formed on the shaft portion of the male member after the forced insertion of the shaft portion into the female member. Moreover, during the forced insertion, the spiral threads in the bore of the female member and the screw threads of the male member are deformed by virtue of the elasticity of the material thereof so as to allow the axial advancement of the shaft portion, and, upon completion of this forced insertion, the screw threads of the male member and the spiral threads of the bore of the female member are allowed to resume their original shapes and consequently are brought into threaded engagement and, during the rotation of the male member relative to the female member, the spiral threads and the screw threads of the male member threadably disengage thereby allowing the extraction of the male member from the female member. It follows that the respective shapes of the leg, the flange of the female member, the head portion and the shaft portion of the male member may be specifically designed so as to suit the purpose for which the fastening device is to be used. Although the present invention has been so far described with respect to its application for the fastening of two panels together, it may also be utilized practically for example for the purpose of fastening parts to panels or attaching fixtures to panels. Further, as is clear from the description given above, the use of the fastener of the present invention is not necessarily limited to the case where the objects to be fastened are joined face to face.

What is claimed is:

1. A fastening device for fastening two objects together each respectively having an aperture therethrough, the apertures being concentrically aligned, said device comprising:

a female member of a flexible synthetic resin and having a body at one end thereof with a flange extending laterally therefrom and a leg, said leg being connected to one side of said body and having a free end longitudinally outwardly extending therefrom for being fitted into the apertures whereby said flange abuts one of the objects;

said female member having a bore therethrough longitudinally extending through said body and said leg;

said leg having at least one elongated groove through the peripheral wall thereof and longitudinally extending in the longitudinal direction of said leg and the peripheral wall of said bore in said body having at least one radially inwardly extending circumferentially continuous spiral ridge integral with and of the same material as said body and having portions in diametrically opposite surfaces of said bore, and the inner surface of said bore in said leg being entirely smooth, for, when a shank having a larger diameter than said bore is inserted therein, having said ridge flex in the longitudinal direction of said bore and having said leg free end radially expand thereby securing the shank within said bore;

a male member made of a synthetic resin and having a head and a shank, said shank being connected to a first side of said head and having a free end longitudinally outwardly extending therefrom for, when an axial force is exerted on said head, being axially thrust into said bore and radially expanding said leg free end and for having said head first side abut said flange thereby fastening the two objects together between said flange one end and said leg free end; and the circumferential surface of said shank having threads integral with and the same material as the shank for, when said shank is axially thrust into said bore, flexing in the longitudinal direction of said bore and, when said shank is secured within said bore and said head abuts said body and said flange, having said threads threadably engaging with said at least one ridge for, when said male member is rotated in one direction, threadably disengaging said male member from said female member thereby axially removing said shank from said bore.

2. A fastening device as claimed in claim 1, wherein the head portion of said male member has a laterally extending groove for receiving a tool for rotating said male member in said one direction.

3. A fastening device as claimed in claim 1, wherein said leg has two diametrically opposed elongated grooves.

4. A fastening device as claimed in claim 1, wherein said leg has four elongated grooves circumferentially spaced from one another.

5. A fastening device as claimed in claim 1, wherein said body has an annular recess therein for, when said head abuts said body, accommodating said head therein and thereby allowing the outwardly facing adjacent surfaces of said body and flange and said head to be flush with one another.

6. A fastening device as claimed in claim 1, wherein the shank of said male member has a semispherical enlarged portion at the end thereof and a diameter which decreases from the longitudinal middle portion toward the semispherical enlarged portion.

7. A fastening device as claimed in claim 1, wherein the leg of said female member is conically shaped.

8. A fastening device as claimed in claim 1, wherein said body has an approximately rectangular cross section for conforming to the shape of the apertures of the objects to be fastened.

* * * * *